March 30, 1937. B. SCHWARTZMAN 2,075,407
COOKING DEVICE
Filed July 28, 1936
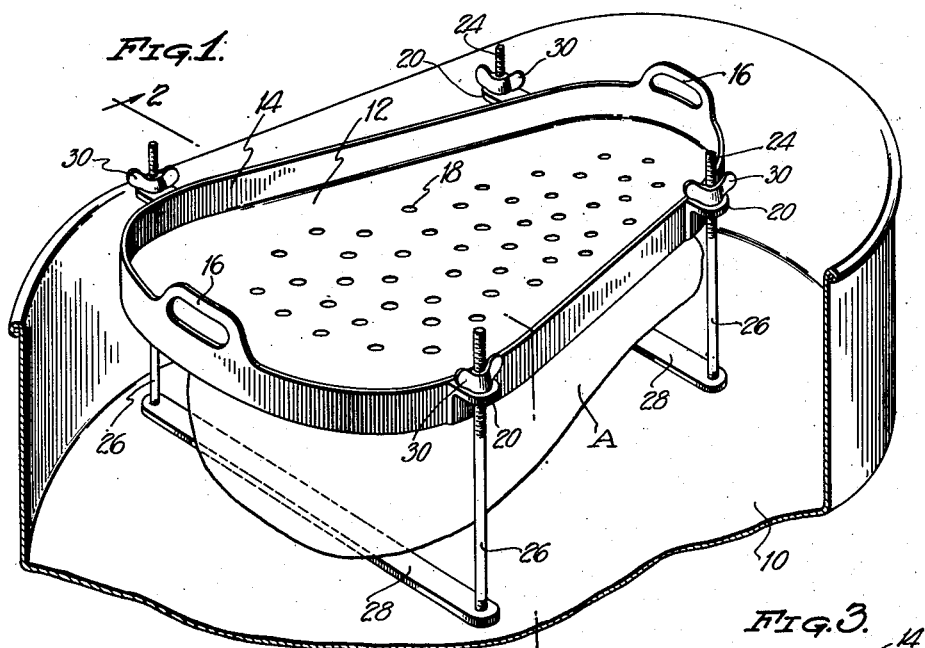
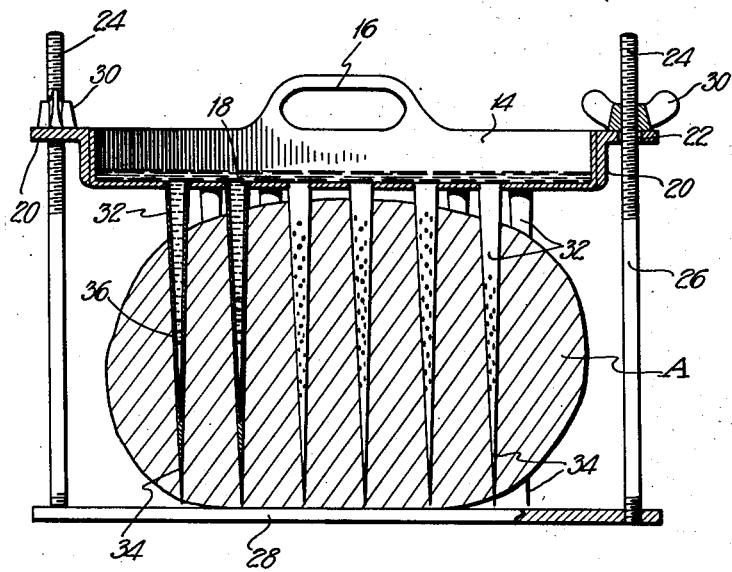
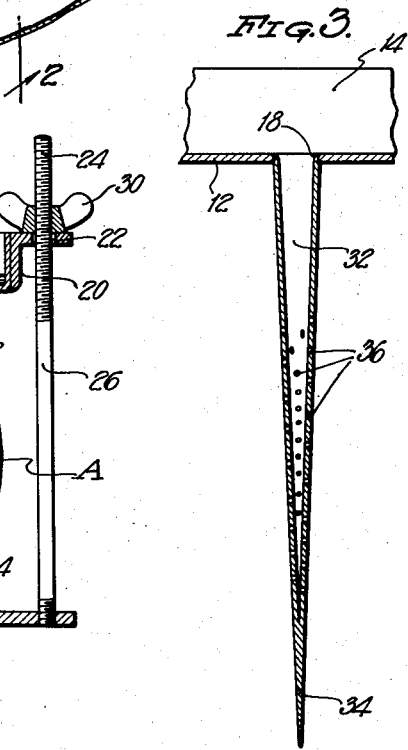
BENJAMIN SCHWARTZMAN.
INVENTOR.
BY Ely Pattison
ATTORNEYS.
WITNESS:

Patented Mar. 30, 1937

2,075,407

UNITED STATES PATENT OFFICE 2,075,407

COOKING DEVICE

Benjamin Schwartzman, New York, N. Y.

Application July 28, 1936, Serial No. 92,973

8 Claims. (Cl. 53—5)

This invention relates to new and useful improvements in cooking devices and more particularly it pertains to a device employed for imparting flavoring fluids to meats such as hams, roasts and the like during the cooking operation.

It is the primary object of the invention to provide a device which may be employed to introduce flavoring fluids directly to the interior of a ham, roast, or the like during the cooking opertion.

It is a further object of the invention to provide a device of the afore-mentioned character which may be used in connection with various sized hams, roasts and the like.

It is a further object of the invention so to construct the device that it may be adjustably mounted within a roasting or other similar cooking pan or utensil.

In some instances, particularly where the meat being cooked is of relatively large size, it may be difficult properly to position the device relatively to the ham or roast, and it is a further object of the invention so to construct the device that where it is employed in connection with relatively large hams or roasts, the mechanical supporting means thereof may be employed properly to position the device with respect to the ham or roast.

Other objects of the invention will appear as the nature of the invention is better understood, for which purpose reference is had to the following specification and the accompanying drawing, in which:

Figure 1 is a perspective view partly broken away showing the device in operative position, Figure 2 is a transverse sectional view taken substantially on the line 2—2 of Figure 1, and;

Figure 3 is an enlarged detail sectional view.

Referring more specifically to the drawing, the reference numeral 10 designates a roasting or similar cooking pan, which, in accordance with the present invention, may be of any conventional form.

A device constructed in accordance with the present invention comprises a relatively shallow pan-like receptacle 12 having flanges 14 defining its side walls. The flanges of the receptacle 12 may be provided with manipulating handles 16 and the bottom of said pan is perforated as at 18. The side walls of the pan-like member 12 are provided with a plurality of ears 20 of which there are preferably four, and said ears are perforated as at 22 to receive the threaded end 24 of vertical standards 26. The vertical standards are connected together at their lower ends in pairs by relatively flat bars or the like 28, and threaded upon the upper ends of the standards there are wing nuts 30, there being one for each standard.

Projecting from the bottom of the pan-like member 12 and having engagement with the interior thereof through the perforations 18, there is a plurality of tubular members 32. These tubular members are preferably tapered in form and provided with a piercing point 34. Between their ends, the tapered members 32 are provided with a series of perforations 36, and as will be noted from Figure 2, those tubular members arranged substantially centrally of the pan-like receptacle 12 are perforated to a greater extent than are the outer tubular perforations. This construction is employed since the ham or roast may be, due to its contour, of less thickness nearer the outer edge thereof, and it is therefore not necessary to perforate these outer tubular members to the same extent as the inner tubular members are perforated. Furthermore, if all of the tubular members were perforated throughout their entire length, there would be a certain amount of waste of flavoring fluid when the device was placed in operation due to the curvature or other formation of the article being cooked.

In operation, the article to be cooked, which in the present illustration of the invention is designated A, is placed in the roasting or similar pan 10 resting upon the connecting bars 28 of the standards 26, as illustrated in Figure 1. The pan-like member 12 is next positioned above the article A and is forced downwardly, causing the tapered tubular members to pierce the article, as illustrated in Figure 2. In the case of a relatively large article A, it may be necessary to apply pressure upon the pan-like member 12 by means of the wing nuts 30 in order properly to position the device relative to the article A being cooked, in which case, the wing nuts 30 are screwed down until the device is positioned as illustrated in Figure 2.

When the device is in the position illustrated in Figure 2, the flavoring fluid, as illustrated in said figure, is introduced into the pan-like member 12 and the same passes therefrom into the tubular members 32 and through the perforations thereof into the interior of the body being cooked. As the cooking process progresses, the heat of the article A tends to draw the fluid into the article and impart the desired flavor to the body thereof. After the article has been cooking it is only necessary to remove the wing nuts 30 and the pan-like member 12, whereupon the device is ready for further use in connection with another article to be cooked.

From the foregoing it will be apparent that the present invention provides a new and improved device for imparting flavoring fluids to articles such as hams, roasts and the like during the cooking operation thereof.

Having thus described the invention, what is claimed as new, is:

1. A device of the character described comprising a receptacle, means for supporting said receptacle in a cooking receptacle over an article to be cooked, and means extending from the receptacle and piercing the article to be cooked, for introducing into said article during the cooking process, a flavoring medium in the first mentioned receptacle.

2. A device of the character described comprising a pan-like receptacle, perforated tubular members extending from the bottom of said receptacle and having communication with the interior thereof, said tubular members being tapered to facilitate their introduction into a body of meat to be cooked, and means for supporting said receptacle in operable relation with a piece of meat to be cooked.

3. A device of the character described comprising a relatively shallow receptacle having a perforated bottom wall, a perforated tubular extension projecting from said bottom wall and communicating with the interior of the receptacle through said perforations, and means for supporting said receptacle in operative relation to an article of food to be cooked.

4. A device of the character described comprising a relatively shallow pan-like receptacle having a perforated bottom, a plurality of tapered perforated tubular members projecting from the bottom wall of the shallow pan-like member and communicating with the interior thereof through said perforations, ears projecting laterally from said shallow pan-like receptacle, threaded standards projecting through said ears, and supporting means connecting said standards in pairs.

5. A device of the character described comprising a plurality of vertically disposed threaded standards, supporting means connecting said standards in pairs, a pan-like member carried by said standards and adapted to clamp between the standards, an article such as a ham or roast to be cooked, and means for introducing seasoning fluids from said pan-like member into the article being cooked.

6. A device of the character described comprising a plurality of vertically disposed threaded standards, supporting means connecting said standards in pairs, a pan-like member carried by said standards and adapted to clamp between the standards, an article such as a ham or roast to be cooked, and means for introducing seasoning fluids from said pan-like member into the article being cooked, said last mentioned means comprising a plurality of tubular extensions projecting from the bottom wall of the pan-like member.

7. A device of the character described comprising a plurality of vertically disposed threaded standards, supporting means connecting said standards in pairs, a pan-like member carried by said standards and adapted to clamp between the standards, an article such as a ham or roast to be cooked, and means for introducing seasoning fluids from said pan-like member into the article being cooked, said last mentioned means comprising a plurality of tapered perforated tubular members extending from the bottom wall of said pan-like member.

8. A device of the character described comprising a plurality of vertically disposed threaded standards, supporting means connecting said standards in pairs, a pan-like member carried by said standards and adapted to clamp between the standards, an article such as a ham or roast to be cooked, and means for introducing seasoning fluids from said pan-like member into the article being cooked, said last mentioned means comprising a plurality of tapered perforated tubular members carried by the pan-like member and extending from the bottom wall thereof, each of said tubular members having a piercing point.

BENJAMIN SCHWARTZMAN.